(12) United States Patent
Hegde et al.

(10) Patent No.: US 11,050,976 B2
(45) Date of Patent: *Jun. 29, 2021

(54) SYSTEMS AND METHODS FOR COMPILING AND PRESENTING HIGHLIGHTS OF A VIDEO CONFERENCE

(71) Applicant: Verizon Patent and Licensing Inc., Basking Ridge, NJ (US)

(72) Inventors: Shaileshchandra Hegde, Karnataka (IN); Kashif Shamaz, Karnataka (IN); David G. Skuratowicz, Felton, CA (US); Selina Hu, Redwood City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,000

(22) Filed: Sep. 21, 2020

(65) Prior Publication Data

US 2021/0058585 A1 Feb. 25, 2021

Related U.S. Application Data

(63) Continuation of application No. 16/593,165, filed on Oct. 4, 2019, now Pat. No. 10,798,341.

(30) Foreign Application Priority Data

Aug. 22, 2019 (IN) .............................. 201931033930

(51) Int. Cl.
*H04N 7/15* (2006.01)
*G10L 15/22* (2006.01)
(Continued)

(52) U.S. Cl.
CPC ............. *H04N 7/155* (2013.01); *G10L 15/22* (2013.01); *G10L 15/26* (2013.01);
(Continued)

(58) Field of Classification Search
CPC . H04N 7/15; H04N 5/44; H04N 5/445; H04L 65/1069; G10L 15/22; G10L 15/26
(Continued)

(56) References Cited

U.S. PATENT DOCUMENTS 7,606,444 B1 * 10/2009 Erol .................... G06K 9/00711
382/305
2004/0114541 A1 * 6/2004 Caspi .................... H04M 3/567
370/260
(Continued)

*Primary Examiner* — Melur Ramakrishnaiah

(57) ABSTRACT

A user interface of a video conference system includes a bi-axial display of highlight information corresponding to highlights designated by participants in a video conference. The biaxial display shows highlights organized in timeline fashion within a panel arranged alongside a display of conference participants, and indications of those highlights within a timeline associated with the display of conference participants. The highlights organized in timeline fashion within the panel may include spaces for comments by the conference participants. Moreover, the panel may be configurable to display either the spaces for comments by the conference participants or an annotated transcript of the video conference, the transcript being annotated with indicators of instances of the highlights.

20 Claims, 17 Drawing Sheets

(51) Int. Cl.
*G10L 15/26* (2006.01)
*H04N 21/47* (2011.01)
*H04N 21/431* (2011.01)
*H04N 21/422* (2011.01)
*G06F 3/0482* (2013.01)

(52) U.S. Cl.
CPC ... *H04N 21/42204* (2013.01); *H04N 21/4316* (2013.01); *H04N 21/47* (2013.01); *G06F 3/0482* (2013.01); *H04N 21/42208* (2013.01)

(58) Field of Classification Search
USPC ............ 348/14.01–14.16; 709/204; 715/753
See application file for complete search history.

(56) References Cited

U.S. PATENT DOCUMENTS

| | | |
|---|---|---|
| 2005/0275715 A1 | 12/2005 | Shingu et al. |
| 2012/0062688 A1* | 3/2012 | Shen .................. G06F 9/451 348/14.03 |
| 2014/0258548 A1 | 9/2014 | Hamada |
| 2018/0039951 A1* | 2/2018 | Wynn .................. H04N 7/15 |
| 2018/0331842 A1* | 11/2018 | Faulkner .................. H04N 7/15 |

* cited by examiner

Meetings Hub | Check out your previous meetings here    Select a range of time  630

TODAY, WED OCT 13 ⌄

632a {
- 11:00 AM – 12:00 PM | DURATION 1H 23M
  Design Round.

Highlights          MEETING ID    PARTICIPANTS (14)
  10 Highlights       1234567       dave@bluejeans.com
  Total Duration      MOD.          Dee Kim
  Watch Now           Selina Hu     Kai Hsu
                                    mari@bluejeans.com
                      ATTEND. TIME  VIEW MORE
                      09:05:23

634

VIEW ALL HIGHLIGHTS ⌄

- 09:00 AM – 10:
  Product Team

- 08:00 AM – 08:30 AM
  Daily Stand Up
}

YESTERDAY, WED OCT 12 ⌄

632b {
- 11:00AM – 12:00 PM | DURATION: 53M
  Smart Meeting Design Review

Highlights
  12 Highlights ... created during the mtg. — 636
  Total duration of Highlights: 5'23"
  Watch Now

VIEW ALL HIGHLIGHTS ⌄  638
}

SYSTEMS AND METHODS FOR COMPILING AND PRESENTING HIGHLIGHTS OF A VIDEO CONFERENCE

CROSS-REFERENCE TO RELATED APPLICATIONS

This application is a continuation of U.S. patent application Ser. No. 16/593,165, filed Oct. 4, 2019, which claims the priority benefit of Indian Application No. 201931033930, filed Aug. 22, 2019, the disclosures of all of which are hereby expressly incorporated herein by reference in their entirety.

FIELD OF THE INVENTION

The present invention is related to the compiling and presentation of highlights of a video conference.

BACKGROUND

In a conventional video conference, a group of invited participants join from a plurality of video conference endpoints, engage in discussion concerning one or more topics, and then leave the conference at the meeting's conclusion. Sometimes, one or more of the participants leave the meeting wondering what, if anything, was agreed. Likewise, one or more originally invited participants that were unable to attend the video conference due to conflicting scheduled events or other circumstances are left wondering what transpired during the meeting.

Of course, meeting participants may have taken notes during the video conference. Also, the conference itself may have been recorded for later playback. While such measures may help in an effort to reconstruct the discussion and agreed actions from a meeting, having to parse through hastily taken notes and/or review an entire meeting's playback from a recording can be tedious, especially for persons not present at the original meeting.

To address these and similar issues, so called meeting assistants have been developed. These meeting assistants are computer-based services that provide transcriptions and summaries of telephone and video conferences. For example, EVA is a so-called enterprise voice assistant provided by Voicea of Mountain View, Calif., that captures portions of in-person, telephone and video conference discussions in response to user commands during those discussions. The captured content can then be used to create reminders and provide meeting recaps for the meeting participants and others. The EVA platform is joined to the meeting as an attendee and monitors the meeting discussion awaiting cues for capturing content.

SUMMARY

In one example, a user interface of a video conference system configured in accordance with the present invention includes a bi-axial display of highlight information corresponding to highlights designated by participants in a video conference. The biaxial display shows highlights organized in timeline fashion within a panel arranged alongside a display of conference participants, and indications of those highlights within a timeline associated with the display of conference participants. The highlights organized in timeline fashion within the panel may include spaces for comments by the conference participants. Moreover, the panel may be configurable to display either the spaces for comments by the conference participants or an annotated transcript of the video conference, the transcript being annotated with indicators of instances of the highlights.

In a further embodiment of the invention, a user interface of a video conference system includes an on-screen display having a first area for presentation of video streams of participants in the video conference and a second area for presentation of highlight selections by the participants in the video conference. Each of the first and second areas includes a timeline representation of the video conference, the timelines being presented along axes orthogonal to one another and each including indications of the highlight selections by the participants. The highlight selections by the participants in the video conference that are presented in the second area may be so presented together with associated comments by the participants. Further, the second area may include an interface selection object to toggle presentation of highlight selections by the participants together with associated comments by the participants with presentation of highlight selections by the participants in context with a transcript of the video conference. The user interface may also include an on-screen display of aggregated highlights of previously recorded video conferences in which the aggregated highlights of the previously recorded video conferences are grouped by meeting in a timeline fashion.

Another embodiment of the invention provides for executing a video conference session by displaying, on a first screen of an endpoint of a video conference system, an interface that includes a first area for presentation of video streams of participants in the video conference session and a second area for presentation of highlight selections by the participants in the video conference session. The first and second areas may each including timelines representations of the video conference, those timelines being presented along axes orthogonal to one another and each including indications of the highlight selections by the participants. Responsive to a participant's selection of a user interface element, an indicator of a highlight is created in each of the timelines in the first and second areas. The interface may further include a selection option for toggling the second area between presentation of highlight selections by the participants together with associated comments by the participants with presentation of highlight selections by the participants in context with a transcript of the video conference, and, responsive to user selection of the selection option, the presentation of highlight selections by the participants together with associated comments by the participants in the second area is toggled with presentation of highlight selections by the participants in context with a transcript of the video conference.

Another embodiment of the present user interface provides a bi-axial display of highlights of a previously recorded video conference, which biaxial display includes highlights organized in timeline fashion within a panel arranged alongside a display of video content of the recorded video conference, and indications of those highlights within a timeline associated with said display of video conference. The highlights organized in timeline fashion within the panel include comments by the conference participants. Further, the user interface includes toggle options for user navigation between the highlights, and, optionally, a user control for automated sequential playback of the highlights.

In one embodiment of the invention, playback of saved highlights of a video conference is responsive to user selection of navigation controls of a user interface such that if a next one of the saved highlights in timeline sequence of a currently playing one of the saved highlights is nonoverlapping with the currently playing one of the saved highlights, the next one of the saved highlights is played, otherwise, if the next one of the saved highlights in timeline sequence of the currently playing one of the saved highlights is overlapping with the currently playing one of the saved highlights, a next nonoverlapping one of the saved highlights with the currently playing one of the saved highlights is played.

In another embodiment of the invention, playback of saved highlights of a video conference is responsive to user selection of an automated playback control of a user interface such that if a next one of the saved highlights in timeline sequence of a currently playing one of the saved highlights is nonoverlapping with the currently playing one of the saved highlights, the next one of the saved highlights is played, otherwise, if the next one of the saved highlights in timeline sequence of the currently playing one of the saved highlights is overlapping with the currently playing one of the saved highlights, the next one of the saved highlights is played from a time index immediately following the currently playing one of the saved highlights without repeating any played portion of the currently playing one of the saved highlights.

These and other embodiments of the invention are more fully described in association with the drawings below.

BRIEF DESCRIPTION OF THE DRAWINGS

FIGS. 6A-6G illustrate aspects of a user interface configured in accordance with an embodiment of the present invention that allows users to compile and present highlights of a video conference.

DETAILED DESCRIPTION

Figure 1:
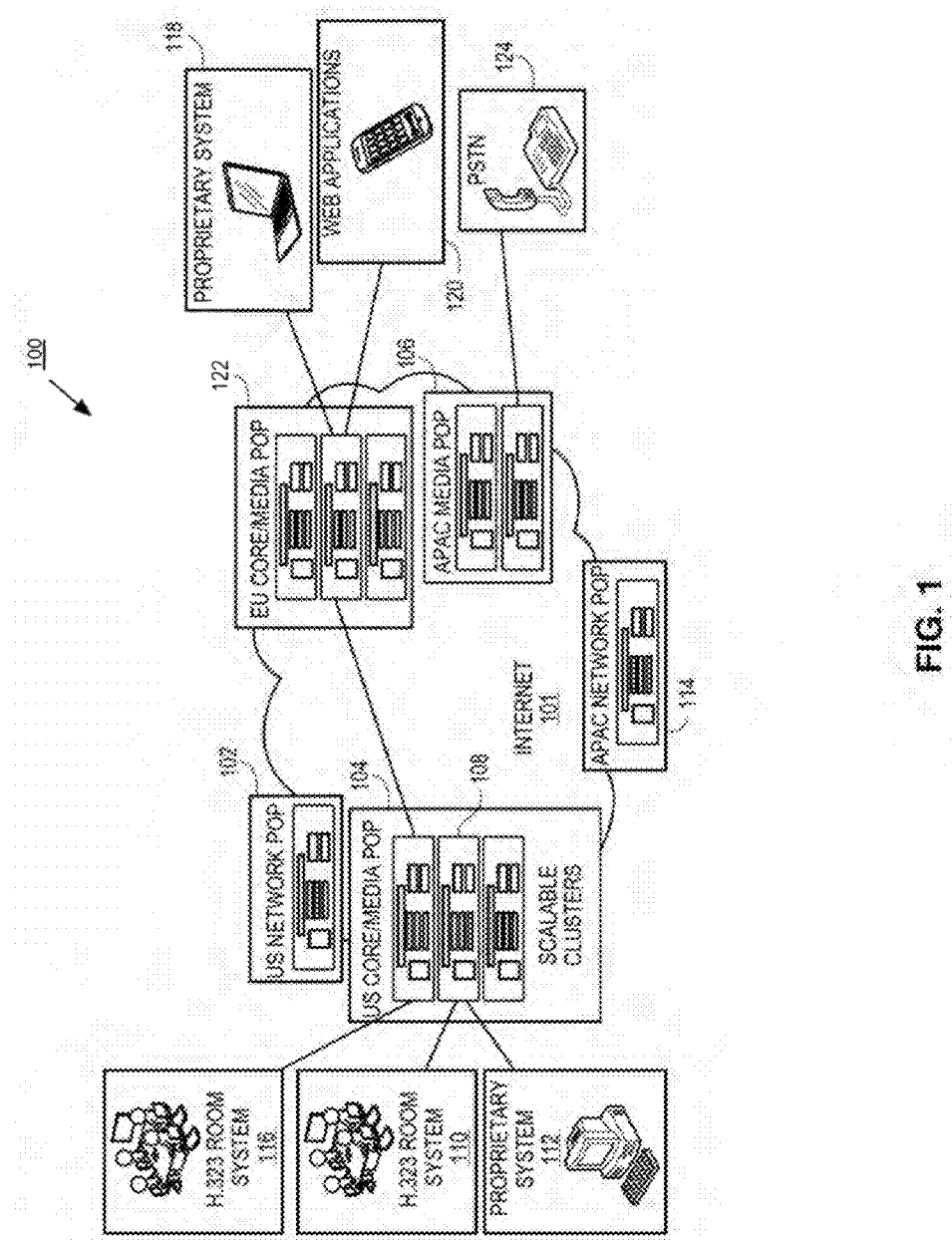
FIG. 1 depicts an exemplary video conferencing system in which user interfaces configured in accordance with embodiments of the invention may be used.

When collaborating in a video conference, participants often need to agree on actions to be taken subsequent to the meeting. Also, participants may need to keep notes to accurately remember what was discussed. And, for those unable to join the meeting, there is often a need to be informed of what was discussed and/or agreed during the meeting so as to contribute to the agreed upon actions and/or keep appraised of others' activities concerning the topic of the meeting.

To support these and other needs, the present invention provides systems and methods for compiling and presenting highlights of a video conference. In particular, embodiments of the invention provide user interfaces that allow meeting participants to capture highlights and to display those highlights, either during an active video conference or a replay or summary thereof. Highlights may be captured at the behest of any meeting participant. When captured, highlights may be displayed in a panel alongside a video display of conference participants, in a vertical timeline-style fashion. Following a meeting, the highlights may be shared with meeting participants and/or others. When replayed, a meeting recording may be annotated to show instances of highlight-flagged content, for example along a horizontal timeline superimposed over a display of the video content as wells as in the vertical timeline-style fashion in a panel alongside that display of video content. The bi-axial display of highlight information allows a reviewer to quickly access the content of the meeting deemed most important by the attendees thereof, in an intuitive fashion. The highlights panel also facilitates the display of an annotated meeting transcript. In addition, meeting highlights may be organized by meeting, by participant, by topic, and/or by other parameter(s) so as to allow meeting participants and others the ability to stay up to date with projects or other activities and/or keep track of their commitments, etc.

Video conference systems configured in accordance with embodiments of the present invention may support a variety of feeds of audio, video, audio and video, and/or other media and/or data streams from video conferencing participant endpoints to present a video conference. Endpoints may be any type of device, including, but not limited to: laptop and/or desktop computers, smartphones, tablet computers, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints. Interactions by and among participants in a video conference encompass the control of a video conference session, its configuration, the visual layout of the data streams from the conference participants, customization of the user interface, and adaptation of a video conference to integrate with and present data streams from different client applications.

FIG. 1 depicts an exemplary video conferencing system 100, in accordance with some embodiments of the invention. The video conferencing system 100 may include one or more points of presence (POPs—e.g., POPs 102, 104, 106, and 114). The POPs may be respectively organized to comprise scalable clusters of nodes, such as media processing nodes 210, as described in connection with FIG. 2 below. Media processing nodes are used to process and compose video conference feeds from various endpoints (e.g., 116, 10, 112, 118, 120, and 124). In certain embodiments, media processing nodes are multipoint control units (MCUs). In certain embodiments, the media processing nodes associated with a POP may work together (and, in some embodiments, work with other POP components) to collectively function as an MCU. In some embodiments, a clustered design makes use of network layer multicast and a multi-bit-rate stream distribution scheme to allow scaling. In certain embodiments, media processing nodes may be implemented with off-the-shelf components, such as Linux/x86 Central Processing Units (CPUs) and PC Graphics Processing Units (GPUs) instead of custom hardware. MCUs based on clusters of media processing nodes can be deployed in a rack-and-stack cloud-computing style and hence achieve the a scalable and cost/performance-efficient approach to support a video conferencing service. Video conferencing system 100 may be used for media stream distribution processing that may be achieved locally on a Local Area Network (LAN) present in each POP and/or across multiple POPs on the Wide Area Network (WAN).

In some embodiments, video conferencing system 100 may be implemented with clusters of microprocessor-based servers (e.g., server 108) both locally on a LAN as well as across geographies serving as the media processing nodes for the MCUs to achieve near unlimited scaling. Endpoints may be, for example, room systems running H.323 (as shown with 110), PCs running H.323, PCs or mobile devices running or Microsoft Skype for Business™ (as shown with 112), etc.

By way of a non-limiting example, video conferencing system 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers.

In some embodiments, the video conferencing system 100 may have multiple other globally distributed private networks to connect to it, including, but not limited to, deployments of video conferencing services such as Microsoft Skype for Business that require federation (i.e. cooperation among multiple organizational entities) at edge nodes and translation and decoding of several communication and transport protocols.

Figure 2:
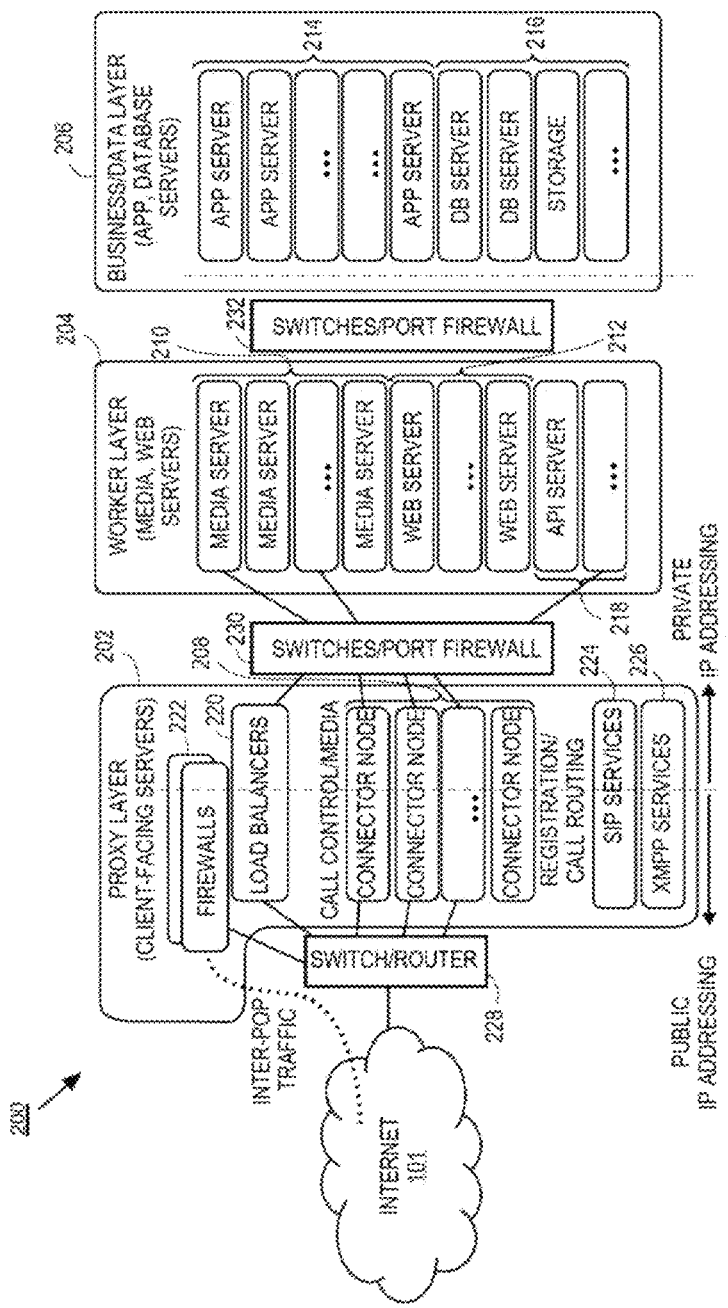
FIG. 2 depicts an exemplary point of presence (POP) media processing node architecture in accordance with some embodiments of the invention.

FIG. 2 depicts an exemplary POP media processing node architecture 200 (e.g., architecture for POPs 102, 104, 106, 114, and 122) accessible over a network 101 with a Proxy Layer 202, a Worker Layer 204, and a Business/Data Layer 206. Some of the components/elements of the POP 200 include but are not limited to, the following: load balancers 220, firewalls 222, media processing nodes (media servers) collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype for Business, SIP, XMPP, and NAT traversal), servers for handling particular communication services or protocols (e.g., SIP services 224 and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the video conferencing system 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media processing nodes 210 of the Worker Layer 204, with such operation of the media processing nodes 210 used to form composite data streams for the endpoints. Translating (when needed) in this context may include receiving the data packets of a data stream communicated using a first communication protocol and retransmitting the received data packets using a second communication protocol.

In some embodiments, application server 214 (e.g., a user experience engine) renders multimedia content including but not limited to the composite audio/video stream to each of the participants to the video conference via one or more user interfaces. One or more application servers 214 may also facilitate provision of the user interfaces discussed herein. Alternatively, endpoints, such as room systems 110, 116, proprietary systems 112, 188, and/or mobile or web-based applications 120 may be configured to provide the user interfaces for use at those video conference endpoints. Regardless of whether the user interfaces are provided locally, by the endpoint systems, or remotely, by the applications servers or other components of the video conference systems, the user interfaces provide for compiling and presenting highlights of video conferences in the manner discussed above. During a video conference a single interface allows meeting participants to capture highlights and to view highlights captured by their co-participants within a running timeline. Post-video conference, the interface combines, in a visual fashion, bi-axial display of highlight information that allows a reviewer to quickly access the content of a previous meeting deemed most important by the attendees thereof. The interface also facilitates the display of an annotated meeting transcript. In addition, the interface provides for review of meeting highlights organized by meeting, by participant, by topic, and/or by other parameter(s) so as to allow a user the ability to stay up to date with projects or other activities and/or keep track of his/her commitments, etc.

User interfaces configured in accordance with embodiments of the present invention thus allow meeting participants to specify and store instances of meeting discussions deemed important as part of a profile both of the meeting and of the individual. To that end, the video conferencing system may be provisioned with stored user profiles for meeting participants that include previous highlight selections of the user with respect to such items. Similarly, the video conferencing system may be provisioned with stored meeting profiles that include highlight selections of some or all of the meeting participants with respect to such items. And, the video conferencing system may be provisioned with stored project profiles that include highlight selections associated with some or all of a plurality of meetings concerning respective projects. User profiles may be configured by default to permit their highlight selections to be automatically included in meeting and project profiles in addition to their user profiles, or to permit such inclusion only if a user expressly assents to same. Likewise, by default individual user-designated highlights captured during a video conference may be automatically available to any or all participants in that meeting and/or with others, unless a user designates a highlight as personal, confidential, or otherwise not to be made available to others. This may be the case, for example, for video conferences that include confidential information that should not be shared outside of a select group of meeting participants or where a meeting participant wishes to make a personal note regarding a discussion item in a meeting but does not want the other meeting participants (or others) to have access to that note. These preferences at an individual, meeting, and/or project level may be specified as part of respective user, meeting, and project profiles that are maintained by the video conference system.

Figure 3:
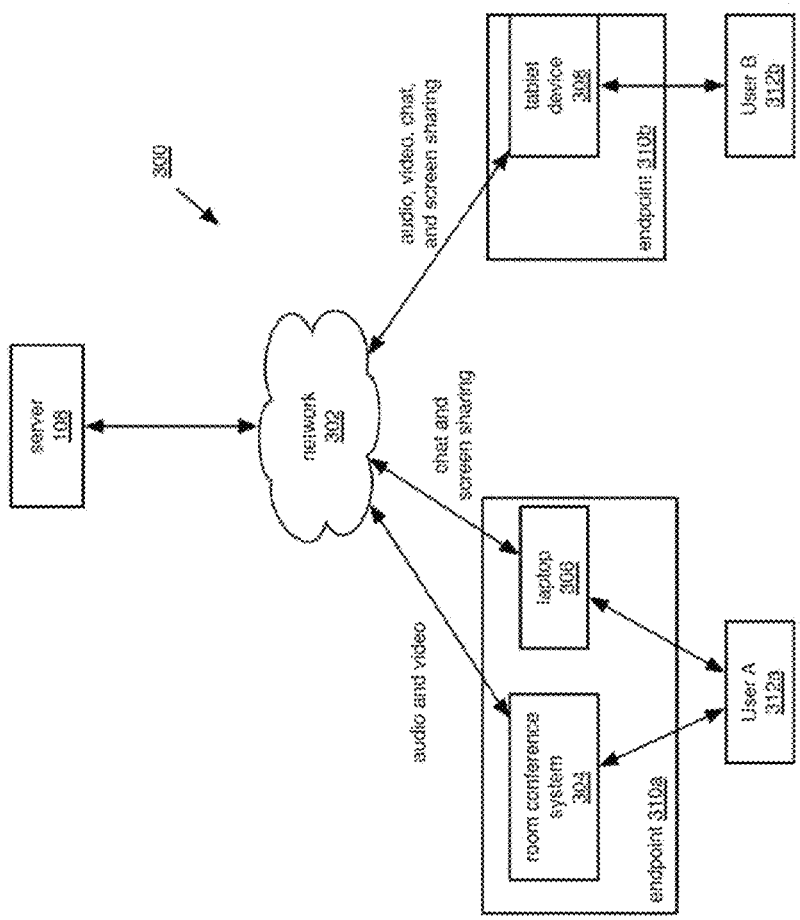
FIG. 3 depicts exemplary components of a video conferencing system in accordance with some embodiments of the invention.

FIG. 3 shows exemplary components of a video conferencing system 300, in which multiple devices may form a single video conference endpoint, each device with its own set of capabilities. A user can join a video conference call with (i) a room conference system that can be used for audio and video, (ii) a tablet computing device or laptop computer that can be used for screen sharing, and (iii) a smartphone that can be used for chat, all of these electronic devices forming a single video conference endpoint. In the embodiment shown in FIG. 3, room conference system 304 and laptop 306 are associated as a single endpoint 310a with User A (312a), and tablet device 308 forms a second endpoint 310b associated with User B (312b). In a video conference facilitated by a room conference system with limited capabilities (e.g., no chat possible), a mobile device (e.g., mobile phone, tablet computer, laptop computer, etc.) can be used to supplement the capabilities of the room conference system (e.g., provide chat).

Server 108 may support a set of capabilities, such as audio, video, chat, screen sharing and the like, for each user or selected users. In one embodiment of the invention, server 108 may also support provision of the user interfaces described herein. Alternatively, the present user interfaces may be provided by clients running at endpoint 310a (e.g., on laptop 306) and/or endpoint 310b (e.g., on tablet device 308). By instantiating the user interface facilities in a server, e.g., a cloud-based server, users are relieved from the need for specialized endpoint equipment and may use conventional web browsers and the like, instead of proprietary clients, to connect to video conferences. Server 108 may be a component of video conferencing system 100, such as a server of POP media processing node architecture 200. Network 302 may be a WAN, the Internet, a telecommunications network, a LAN, or the like.

In certain embodiments, a user may identify himself/herself at the time of joining a video conference with a device, by pairing the device with another device already joined into the video conference. For instance, after a first user joins a video conference using a first device, server 108 may provide the first user with a short alphanumeric code that can be used to associate any further devices that join the video conference with the first user. That is, the first user can join a second device into the video conference by entering the short alphanumeric code on the second device; the second device may then provide the short alphanumeric code to server 108; and server 108 may then associate both the first and second devices with the first user.

In addition, and/or alternatively, pairing may be heuristically determined by the server. For instance, server 108 may detect similar signals (e.g., similarity being measured based on the correlation between two signals) being received from a first device and a second device. As such correlation may indicate two devices being used by the same user, server 108 may then associate the first and second devices with the same user (and/or with the same video conference endpoint).

Figure 4:
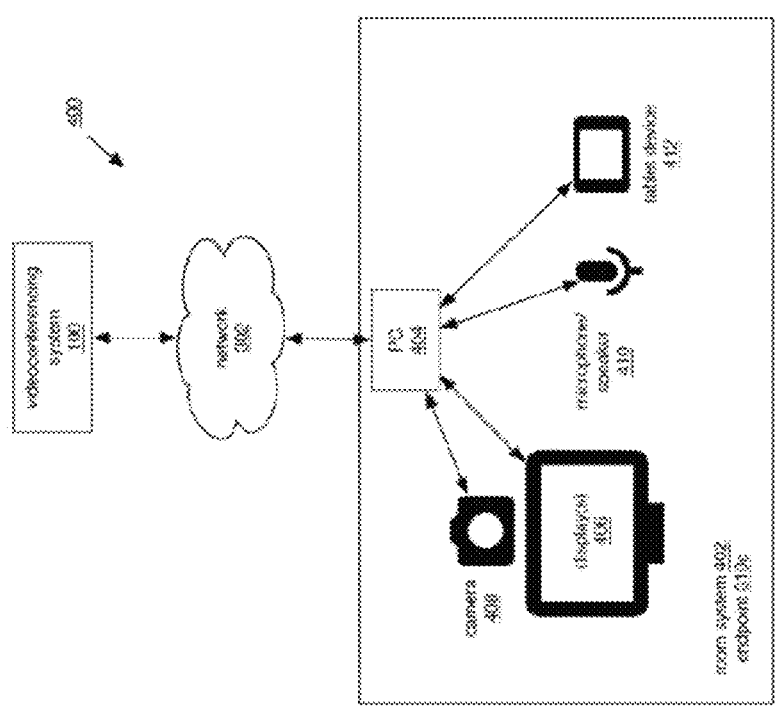
FIG. 4 depicts exemplary components of an exemplary room system endpoint in a video conferencing system in accordance with some embodiments of the invention.

FIG. 4 shows the components of an exemplary room system endpoint 310c in a video conferencing system 400. Room system 402, functioning as an endpoint 310c, may comprise a personal computer (PC) 404, one or more displays 406, a camera 408, a microphone and speaker 410, and a tablet device 412. In various embodiments, user interfaces in accordance with embodiments of the present invention may be displayed on display 406 and/or tablet 412.

Personal computer 404 may act as a hub for mediating data communications between some or all of the components of the room system endpoint 310c. Where the user interface is provisioned at the endpoint 310c, it may be a component of a video conference client stored and executed on PC 404. Display(s) 406 may be a television, a monitor, or a projector paired with a projector screen or white board. The microphone and speaker may be contained in a single device or multiple devices. In certain embodiments, the room system 402 may include multiple microphones and speakers, or none at all. Tablet computing device 412 (alternatively, another mobile device such as a smartphone) may provide a user interface for configuring and/or controlling the video conferencing experience at room system 402.

Figure 5:
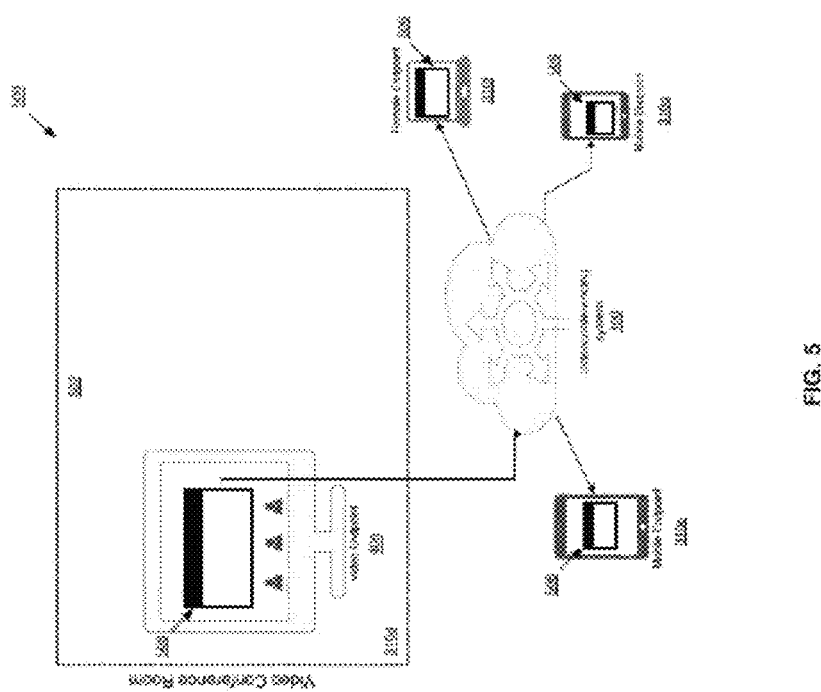
FIG. 5 shows components of an exemplary video conferencing system in which user interfaces configured in accordance with embodiments of the invention may be used.

FIG. 5 shows components of an exemplary video conferencing system 500 in which one endpoint 310d includes a room system 502 with a display 406. Other devices associated with endpoint 310d (not depicted in FIG. 5) may include components previously described in association with room system 402, for example, PC 404, camera 408, a microphone and/or speaker 410, and tablet device 412. In certain embodiments, display 406 may be the display of a laptop or tablet computer. FIG. 5 also shows three remote endpoints-mobile endpoints 310e and 310g, and remote laptop endpoint 310f. As shown, the remote endpoints are in communication with room system 310d via video conferencing system 100. Displays at each endpoint associated with a video conference (e.g., the respective displays of mobile devices at endpoints 310e and 310g and laptop 310f) may present instances 506 of the present user interface.

FIGS. 6A-6G illustrate aspects of a user interface configured in accordance with an embodiment of the present invention that allows users to compile and present highlights of a video conference. Various screens of the user interface are shown as if presented on a display 600 as might be associated with a personal computer or work station. This is primarily for purposes of illustration and in various implementations the user interface screens may be displayed in other fashions, for example on the display of a mobile device such as a laptop or notebook computer, smart phone, tablet, etc., or another device.

Figure 6A:
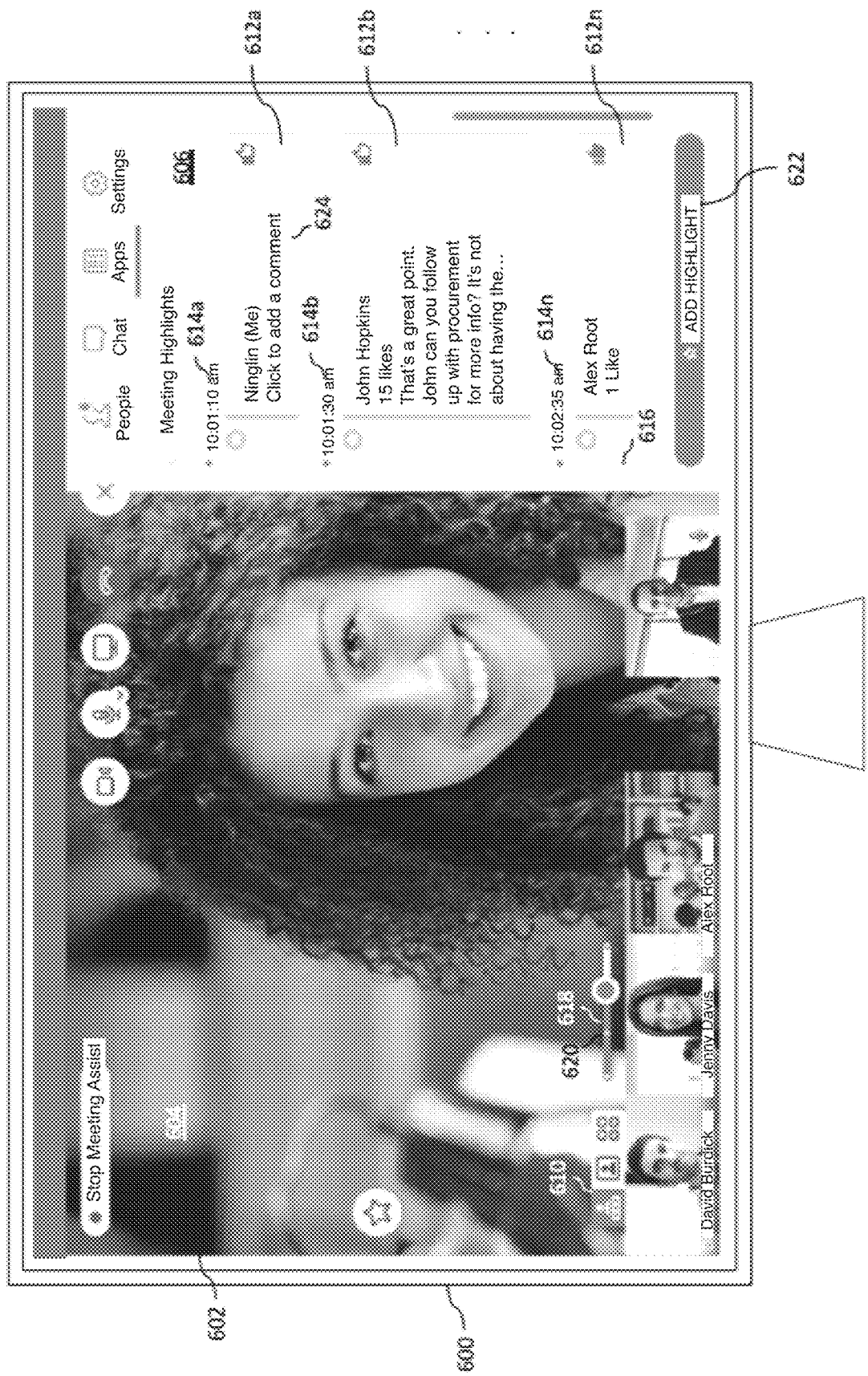

Referring first to FIG. 6A, screen 602 of the user interface is shown in a full-screen view on display 600 and includes a video content portion 604 and a highlights panel 606. The video content portion 604 includes options 610 for displaying the video conference participants in different manners. Shown is a "current speaker" view in which the majority of the video content portion 604 is devoted to displaying a video feed associated with a currently active speaker. Other participants who at not presently speaking are shown in reduced size at the bottom of the video content portion 604, but this placement is optional, and the video feeds associated with the other participants could be presented at other locations of the video content portion 604. Other options may allow for presenting all (or most) video feeds associated with meeting participants in a grid-like fashion or in other arrangements.

Presented alongside the video content portion 604 is highlights panel 606. In the illustrated example the highlights panel 606 is shown to the right of the video content portion 604 but this location is optional and user settings for the video conference system may allow a meeting participant to vary the relative locations of the video content portion 604 and highlights panel 606 with respect to one another. For example, the illustrated arrangement may be switched so that the video content portion 604 is displayed to the right of the highlights panel 606. Or, the two may be arranged so that one is displayed above the other. In still further embodiments, the highlights panel 606 may be displayed so as to appear to be floating over the video content portion 604, especially when video content portion 604 displays the meeting participants in a grid-like or other fashion.

As shown in the illustration, the highlights panel 606 displays highlights 612a-612n designated by meeting participants. The highlights may or may not have accompanying notes or comments from the meeting participants. The highlights 612a-612n are associated with time indexes 614a-614n and are arranged in a timeline 616 that scrolls from earlier in time at the top to later in time at the bottom of the highlights panel 606. The timeline 616 of the highlights panel 606 is coordinated with a timeline 618 shown in the video content portion 604 and the timeline 618 includes indicators 620 that designate time instances at which participants have designated highlights. Thus, highlights are indicated in a bi-axial fashion.

To allow for meeting participants to indicate highlights, the interface includes an "add highlight" button or another interface element 622. Selecting interface element 622 causes an instance of a highlight to be created within each of timelines 616 and 618. In timeline 616, the highlight will be accompanied by a text box 624 that allows a user to include a comment or note. While such a feature is optional, it is helpful inasmuch as other participants can then add to the comment or note and/or indicate their agreement or disagreement with it.

Figure 6B:
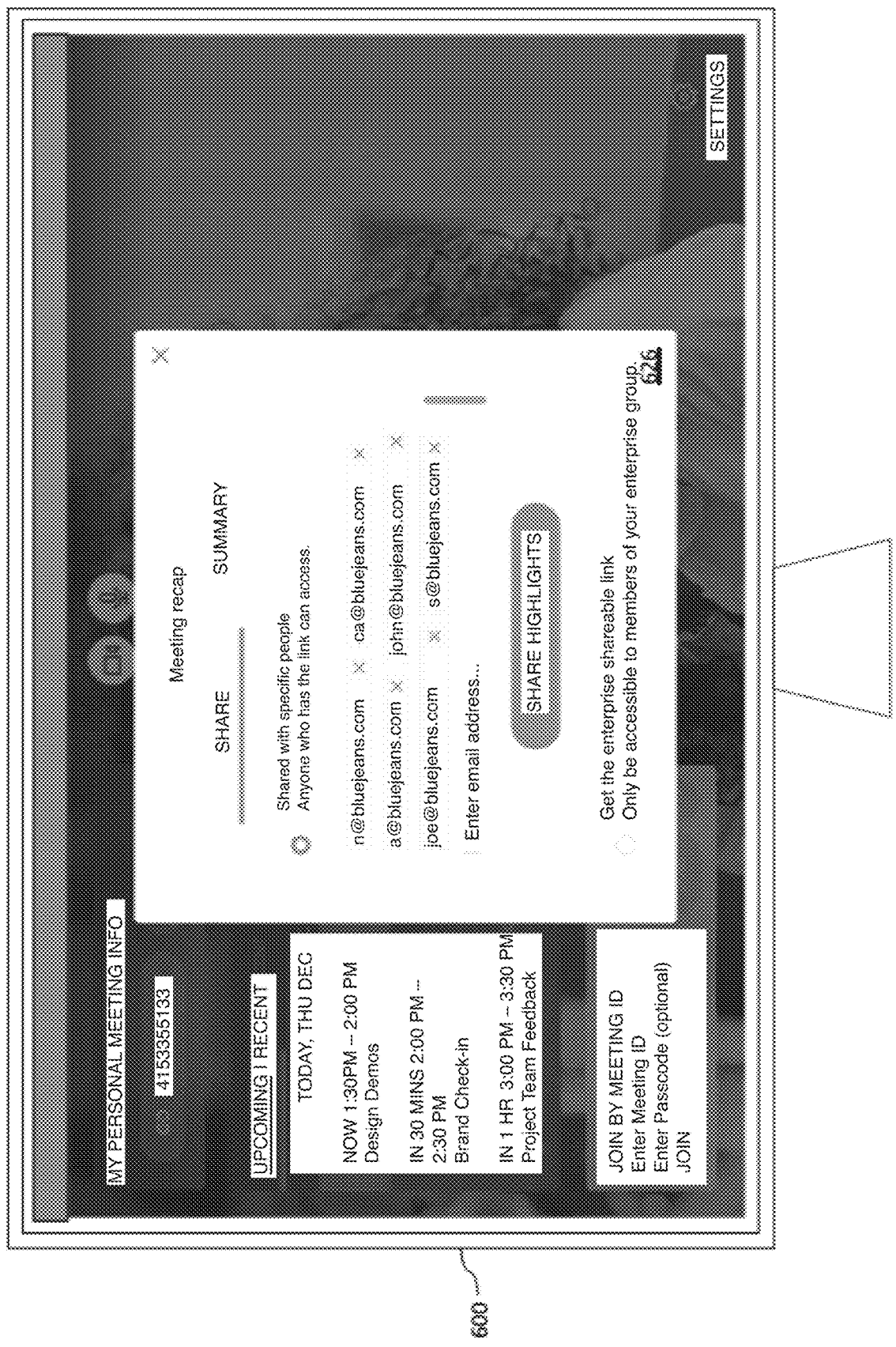

In one embodiment of the invention, the highlights 612a-612n and any associated notes/comments are stored as metadata along with the audio-video content of the video conference by the video conference system. For example, the highlights and any notes/comments may be stored as text or other files and indexed by meeting identifier and time index so that they can be associated with the audio-video content of the video conference. Other forms of storage and association may also be used. As shown in FIG. 6B, after a video conference has concluded, the saved highlights (or a pointer thereto) can then be shared by one or more of the meeting participants with others using a form 626 that also for such sharing. When so shared, others who may not have participated in the original meeting will have an opportunity to quickly review the substance of the meeting by browsing the highlights and reading the associated notes/comments while watching and listening to the associated audio-video content of the meeting at the time the highlight was designated.

Figure 6C:
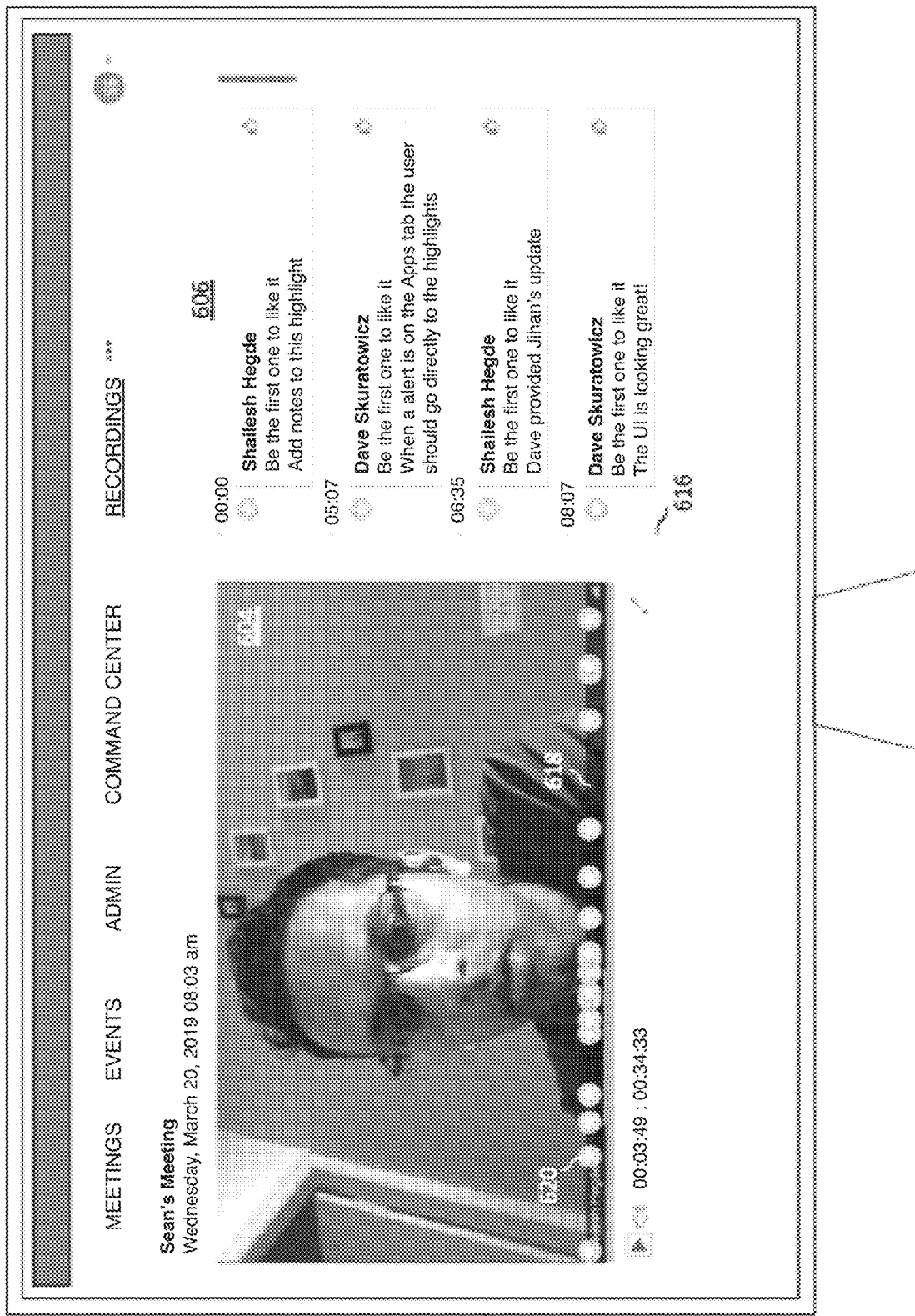

FIG. 6C shows an example of such a review. In this example, a user is reviewing a previously recorded video conference entitled "Sean's Meeting." The recorded audio-video content from that meeting plays in the video content portion 604 of the interface while the previously designated highlights from the meeting are arranged along the timeline 616 in the highlights panel 606. Rather than having to sit through a review of the entire meeting, however, the user can quickly access the portions of the meeting that the participants deemed to be of importance by selecting the highlights, either in the timeline 616 of the highlights panel 606 or the timeline 618 of the video content portion 604. When a highlight is selected (e.g., by a cursor control operation such as a mouse click while a cursor is positioned over a highlight in one of the timelines or by tabbing between highlights, etc.) in this fashion, the associated audio-video content from the video conference is played in the video content portion 604 of the interface. For example, in one embodiment audio-video content from a few seconds prior to the time index associated with a selected highlight to a few seconds after that time index is played. In other embodiments the portion of audio-video content surrounding an associated time index of a selected highlight may be a user-configurable parameter. For example, as part of a profile and/or session setting, a user may designate the amount of time prior to a selected highlight time index and the amount of time after a selected highlight time index to be played. Of course, a user may also manipulate the playback around a selected highlight by manually adjusting a slider associated with the audio-video content being presented in the video content portion 604 using a cursor.

Referring now to FIG. 6D, an example of a meetings hub 630 is illustrated. Meetings hub 630 is a portion of the present user interface in which links to recordings of a user's previous meetings are collected and displayed. As shown in the illustration, the links to the recordings may be grouped 632a, 632b, etc. by date and arranged in timeline fashion within each grouping. Each meeting instance 634 within a group can be selected so as to display information about the subject meeting, such as a meeting identifier, the participants, the meeting host or moderator, the duration (e.g., the duration of the meeting and/or the portion of the meeting which the user attended), etc. Also include is information 636 concerning the meeting highlights that were designated and links to access those highlights, e.g., via screens such as that illustrated in FIG. 6C.

Figure 6E:
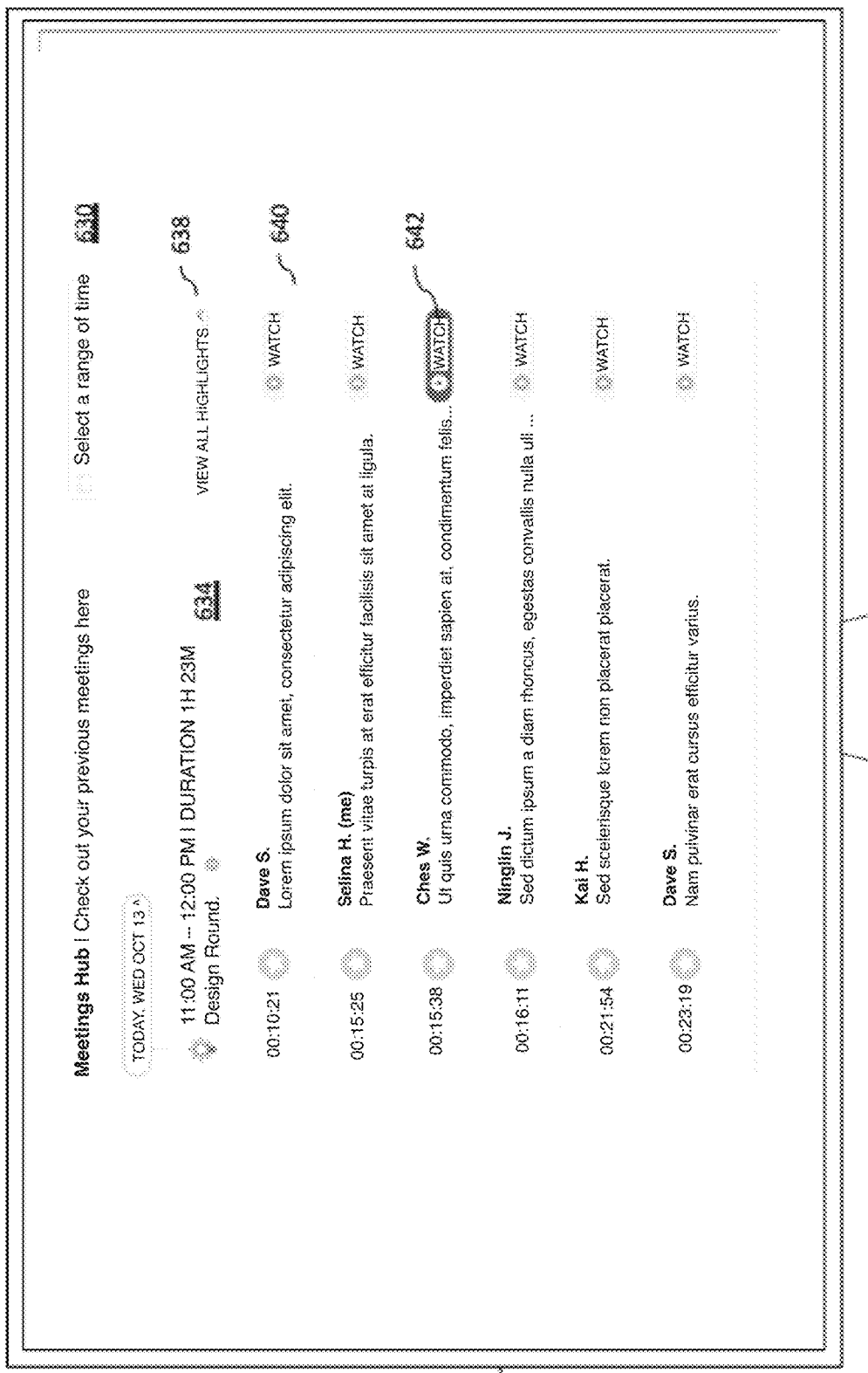

FIG. 6E illustrates an example of the Meetings Hub screen when a user selects link 638 to view highlights associated with a meeting. As shown, selection of the link causes the meeting highlights menu 640 for the subject meeting to be displayed. From the menu 640, a user can view one or more highlights by selection of an appropriate interface element (such as a button, slider, etc.) 642.

Figure 6F:
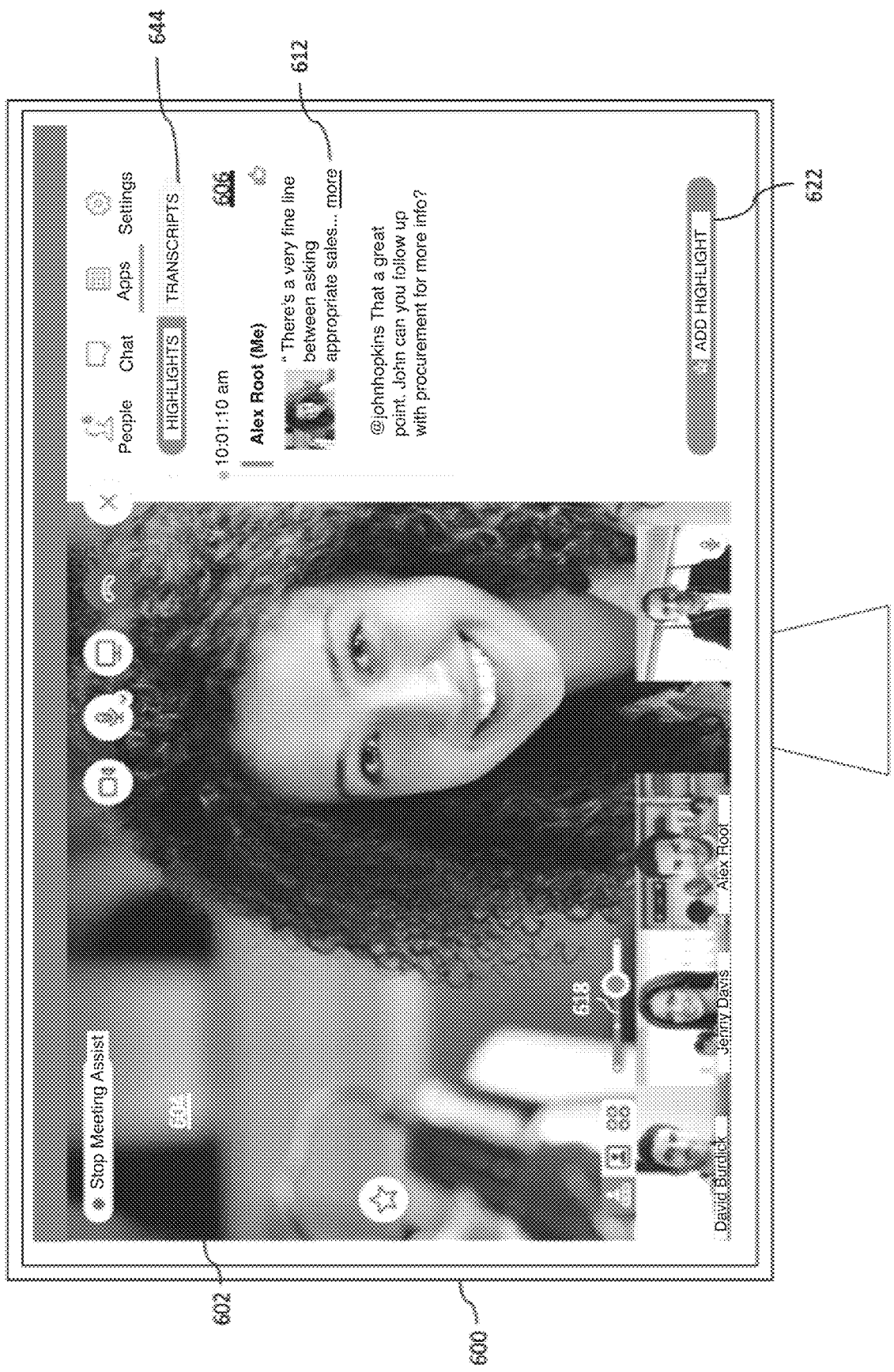
Figure 6G:

Now referring to FIGS. 6F and 6G, an alternative version of the present user interface is illustrated. In this example, the highlights panel 606 can be toggled to display highlights 612 with associated comments, notes, etc., or a highlighted transcript of the video conference 646. The selection of highlights with comments or a highlighted transcript may be made using toggle switch 644 or another user interface element instrumented for that purpose. As Shown in FIG. 6G, the highlighted transcript scrolls in synchronization with the audio-video content presented in video content portion 604. This may be done in real time during a live video conference, in conjunction with a replay of a previously recorded video conference, or both. When highlights are added, the transcript is marked, e.g., using a highlight indicator 648.

Figure 8A:
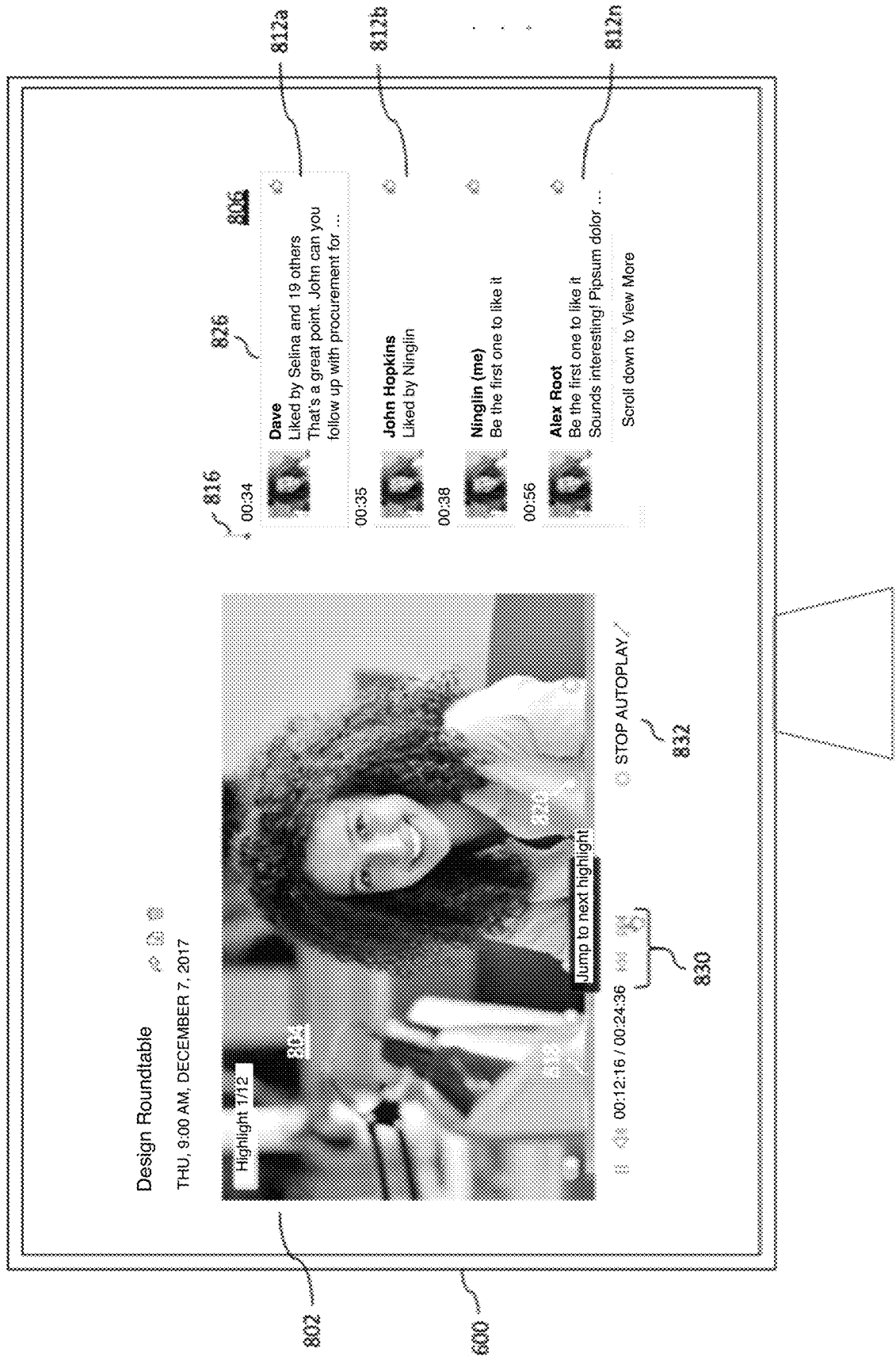
FIGS. 8A-8C illustrate further aspects of a user interface configured in accordance with an embodiment of the present invention that allows users to review highlights of a video conference.
Figure 8B:
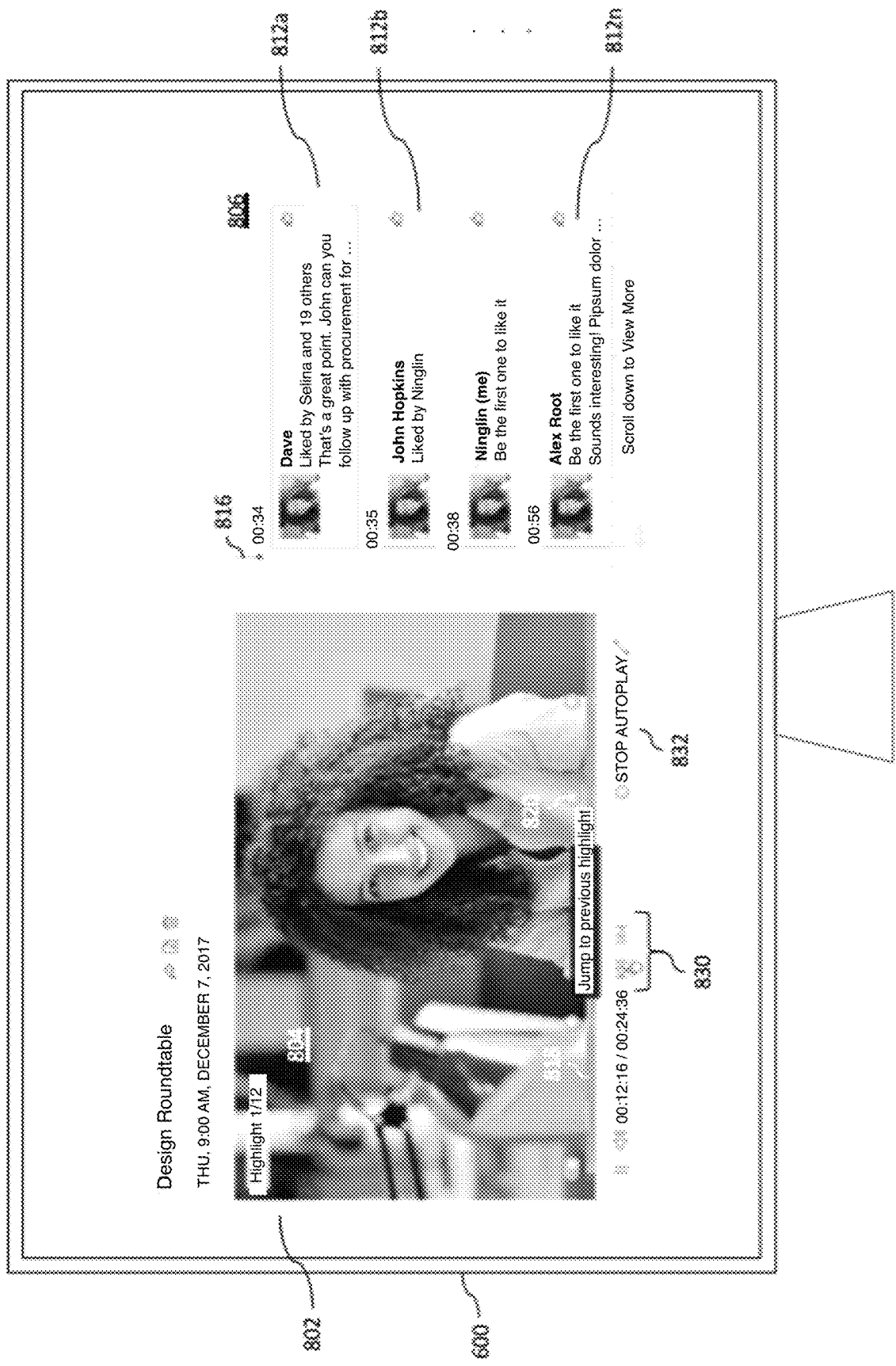
Figure 8C:
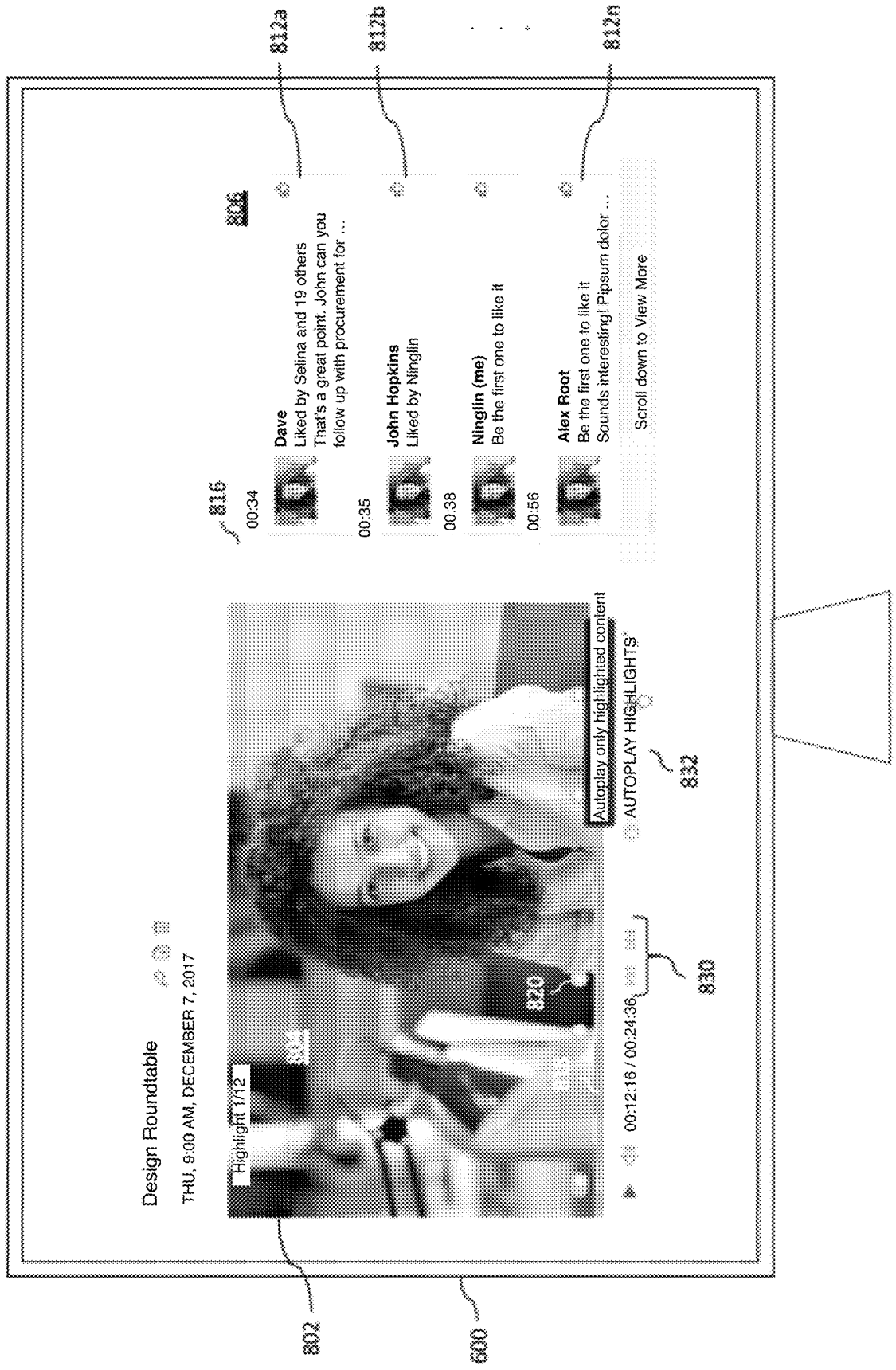

Now referring to FIGS. 8A-8c, additional aspects of the present user interface are illustrated. In these figures, a user is reviewing highlights of a previous video conference entitled Design Roundtable on display 600. Screen 802 of the user interface is shown on display 600 and includes a video content portion 804 and a highlights panel 806. The video content portion 804 provides playback of the previously recorded video conference. Presented alongside the video content portion 804 is highlights panel 806. In the illustrated example the highlights panel 806 is shown to the right of the video content portion 804 but this location is optional and user settings for the video conference system may allow a meeting participant to vary the relative locations of the video content portion 804 and highlights panel 806 with respect to one another. For example, the illustrated arrangement may be switched so that the video content portion 804 is displayed to the right of the highlights panel 806. Or, the two may be arranged so that one is displayed above the other.

As shown in the illustration, the highlights panel 806 displays highlights 812*a*-812*n* that were designated by participants in the original meeting. The highlights may or may not have accompanying notes or comments from the meeting participants. The highlights 812*a*-812*n* are associated with time indexes and are arranged in a timeline 816 that scrolls from earlier in time at the top to later in time at the bottom of the highlights panel 806. The timeline 816 of the highlights panel 806 is coordinated with a timeline 818 shown in the video content portion 804 and the timeline 818 includes indicators 820 that designate time instances at which participants have designated highlights. Thus, highlights are indicated in a bi-axial fashion.

The present user interface allows a user that is interested in the recorded video conference to quickly access the portions of the meeting that the participants deemed to be of importance by selecting the highlights, either in the timeline 816 of the highlights panel 806 or the timeline 818 of the video content portion 804. When a highlight is selected (e.g., by a cursor control operation such as a mouse click while a cursor is positioned over a highlight in one of the timelines or by tabbing between highlights, etc.) in this fashion, the associated audio-video content from the video conference is played in the video content portion 804 of the interface. For example, in one embodiment audio-video content from a few seconds prior to the time index associated with a selected highlight to a few seconds after that time index is played. In other embodiments the portion of audio-video content surrounding an associated time index of a selected highlight may be a user-configurable parameter. Of course, a user may also manipulate the playback around a selected highlight by manually adjusting a slider associated with the audio-video content being presented in the video content portion 804 using a cursor. Further, the user may skip between highlights, both forward or backward in time, using toggles 830. Selecting a forward one of toggles 830, as shown in FIG. 8A, causes the playback to skip to the beginning of the next highlight in the timeline. Selecting a reverse one of toggles 830, as shown in FIG. 8B, causes the playback to skip to the beginning of the previous highlight in the timeline. The currently playing highlight is also indicated in highlight panel 806, e.g., by an indicator box 826.

Figure 9A:
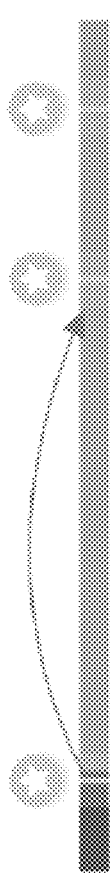
FIGS. 9A-9C illustrate playback of overlapping and nonoverlapping highlights for one embodiment of the present invention.
Figure 9B:
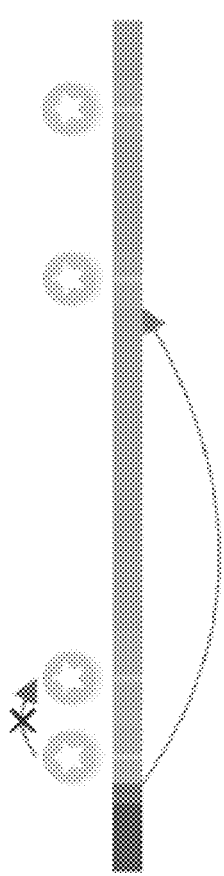

Note that this navigation between highlights is altered somewhat in the case of overlapping highlights. For example, and referring to FIG. 9A, in the case of non-overlapping highlights, that is, highlights which do not share any portion of associated recorded audio-video content, playback of successive highlights in response to user selection of one of the toggles 830 proceeds from one to the next, with the next highlight in sequence (either forward or backward in time) being played from its beginning. FIG. 9B shows the case of overlapping highlights, where two or more highlights share at least some associated recorded audio-video content. In this instance, selection of one of the toggles 830 results in playback of a next non-overlapping highlight commencing, instead of the next highlight in sequence that overlaps with a currently playing highlight.

Figure 9C:
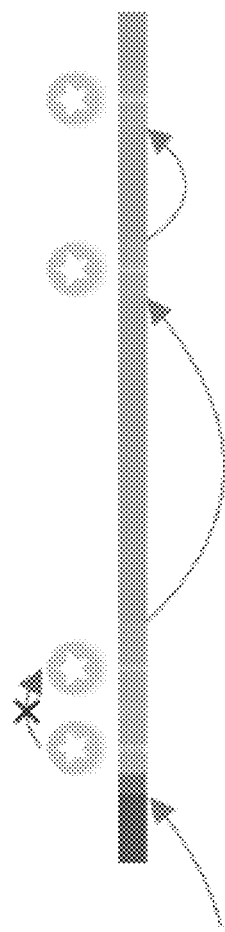

Returning to FIGS. 8A-8C, also illustrated is an autoplay feature for reviewing highlights. By selecting autoplay control 832, a user may play the audio-video portions of the recorded video conference that are associated with each highlight. This playback proceeds through the highlights in sequence. As shown in FIG. 9C, during autoplay, playback of overlapping highlights does not cause replay of the overlapping portion. Instead, the overlapping highlights are treated as a single highlight, the content associated with the overlapping highlights is played through, without replay, and then the playback proceeds to the beginning of the next non-overlapping highlight. Non-overlapping highlights are played in sequence.

The examples shown and described herein present the user interfaces in a text-centric way, but readers should recognize that in practice rich, color graphic layouts may be used. Further, customary user interface tools such as pop-ups, tool tips, previews, help buttons, etc. all may be included in user interfaces configured in accordance with the present invention.

The various user interfaces described herein, and equivalents thereof, may be invoked in response to user selection of associated screen objects that indicate user selections during a video conference. For example, a window within which a video conference application is being displayed, or a browser window in cases where the video conference is presented through the browser, may include a selection object to add a highlight. Upon selecting this object, e.g., via mouse click, menu item selection, or other cursor control action, the user may be provided the opportunity to add a comment or other notes 612 in conjunction with the highlight indication.

Figure 7:
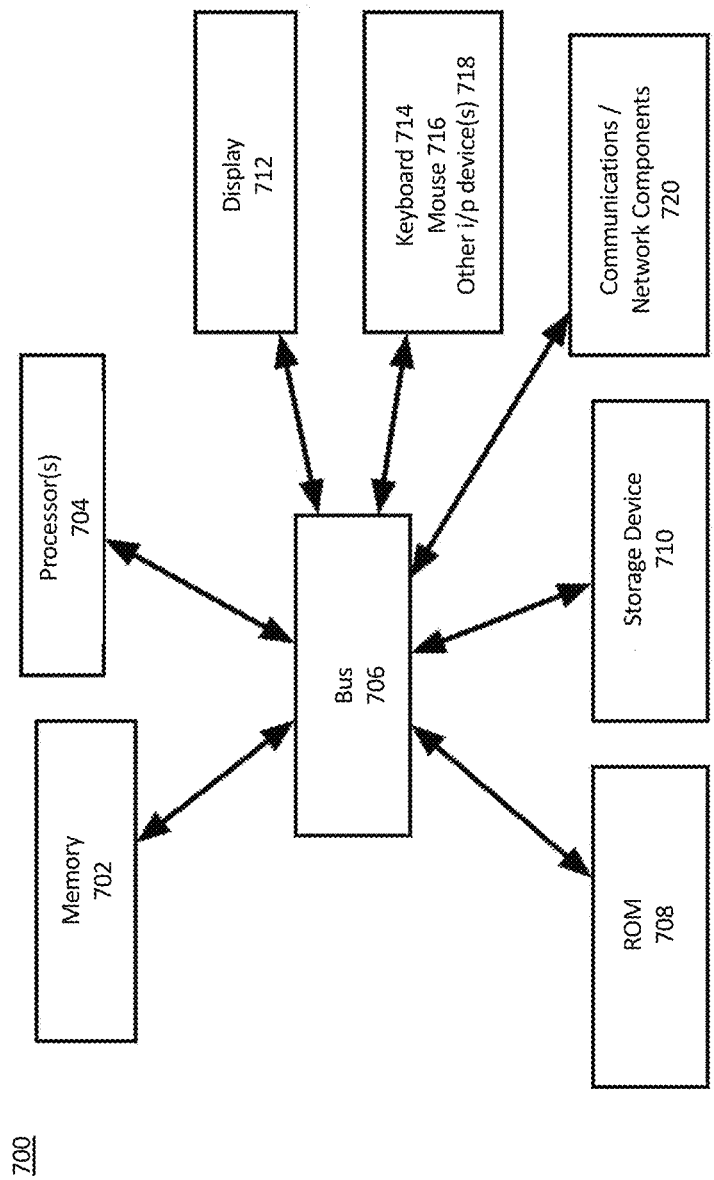
FIG. 7 depicts a block diagram of an exemplary computing system in accordance with some embodiments of the invention.

FIG. 7 depicts a block diagram showing an exemplary computing system 700 that is representative of any of the computer systems or electronic devices discussed herein. Note that not all of the various computer systems have all of the features of system 700. For example, systems may not include a display inasmuch as the display function may be provided by a client computer communicatively coupled to the computer system or a display function may be unnecessary.

System 700 includes a bus 706 or other communication mechanism for communicating information, and one or more processors 704 coupled with the bus 706 for processing information. Computer system 700 also includes a main memory 702, such as a random access memory or other dynamic storage device, coupled to the bus 706 for storing information and instructions to be executed by processor(s) 704. Main memory 702 also may be used for storing temporary variables or other intermediate information during execution of instructions to be executed by processor(s) 704.

System 700 includes a read only memory (ROM) 708 or other static storage device coupled to the bus 1206 for storing static information and instructions for the processor(s) 704. A storage device 710, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor(s) 704 can read, is provided and coupled to the bus 706 for storing information and instructions (e.g., operating systems, applications programs and the like).

Computer system 700 may be coupled via the bus 706 to a display 712 for displaying information to a computer user. An input device such as keyboard 714, mouse 716, or other input devices 718 may be coupled to the bus 706 for communicating information and command selections to the processor(s) 704. Communications/network components 720 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor(s) 704 executing appropriate sequences of computer-readable instructions contained in main memory 702. Such instructions may be read into main memory 702 from another computer-readable medium, such as storage device 710, and execution of the sequences of instructions contained in the main memory 702 causes the processor(s) 704 to perform the associated actions. In alternative embodiments, hard-wired circuitry or firmware-controlled processing units (e.g., field programmable gate arrays) may be used in place of or in combination with processor(s) 704 and its associated computer software instructions to implement embodiments of the invention. The computer-readable instructions may be rendered in any computer language including, without limitation, Python, Objective C, C#, C/C++, Java, JavaScript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1200 or similar electronic computing device, that manipulates and transforms data represented as physical (electronic) quantities within its registers and memories into other data similarly represented as physical quantities within its memories or registers or other such information storage, transmission or display devices.

It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A user interface of a video conference system, said user interface comprising:

a display of highlight information corresponding to media content highlights designated by one or more conference participants in a video conference, the display providing:

the media content highlights sequentially organized along a first manually-adjustable recording timeline slider within a panel that is arranged orthogonally alongside a video display, of the one or more conference participants, having a second manually-adjustable recording timeline slider enabled for correlated displacement relative to the first manually-adjustable recording timeline slider, wherein the panel includes one or more transcripts of the media content highlights, at least one of the transcripts being annotated with visual indicators that mark a corresponding instance of the media content highlights, and indications of said media content highlights at the first manually-adjustable recording timeline slider associated with recording time-based control of said video display of the one or more conference participants.

2. The user interface of claim 1, wherein the panel includes spaces for textual comments corresponding to the media content highlights and contemporaneously entered by multiple conference participants of the one or more conference participants.

3. The user interface of claim 2, wherein the panel further includes a toggle switch that is configurable to selectively display either the spaces for textual comments by the conference participants or the one or more transcripts of the media content highlights.

4. The user interface of claim 1, wherein the visual indicators are presented without time indexes of the corresponding instances of the media content highlights.

5. A non-transitory computer-readable storage medium storing instructions executable by a processor of a user interface device of a video conference system, which when executed cause the user interface device to:

generate an on-screen display providing:

a first area containing media streams of one or more conference participants in a video conference, and a second area containing selections of the media streams designated by the one or more participants in the video conference, the first and second areas each including correlated recording timelines that are chronological representations of the video conference, the recording timelines of the first and second areas being presented along axes orthogonal to one another and each including indications of the media stream selections by the one or more conference participants, wherein the second area includes a transcript of a first media stream selection, the transcript being annotated with a visual indicator that marks a corresponding instance of the first media stream selection.

6. The non-transitory computer-readable storage medium of claim 5, wherein the media stream selections are presented in the second area together with associated textual comments contemporaneously entered by multiple conference participants of the one or more conference participants.

7. The non-transitory computer-readable storage medium of claim 5, wherein the second area includes an interface selection object to toggle between alternate presentation of the first media stream selection together with associated comments contemporaneously entered by the one or more conference participants and presentation of the first media stream selection in context with the transcript of the first media stream selection.

8. The non-transitory computer-readable storage medium of claim 5, further comprising an on-screen display of aggregated highlights of previously recorded video conferences.

9. The non-transitory computer-readable storage medium of claim 8, wherein the on-screen display of aggregated highlights of previously recorded video conferences groups the highlights by meeting in a timeline fashion.

10. A method comprising:
  generating a display, on a first screen of an endpoint of a video conference system, a user interface that comprises:
    a first area containing media streams of one or more conference participants in a video conference session, and
    a second area containing selections of the media streams designated by the one or more participants in the video conference session, the first and second areas each including correlated recording timelines that are chronological representations of the video conference, the recording timelines of the first and second areas being presented along axes orthogonal to one another and each including indications of the media stream selections by the one or more conference participants, wherein the second area includes a transcript of a first media stream selection, the transcript being annotated with a visual indicator that marks a corresponding instance of the first media stream selection; and
  creating, responsive to a first conference participant's selection of a user interface element, an indicator of a first media stream selection in each of the correlated recording timelines in the first and second areas.

11. The method of claim 10, wherein the user interface further includes a selection option for toggling the second area between alternate presentation of the first media stream selection together with associated comments contemporaneously entered by the one or more conference participants and presentation of the first media stream selection in context with the transcript of the first media stream selection, and, responsive to user selection of the selection option, toggling the presentation of the first media stream selection together with the associated comments in the second area with the presentation of the first media stream selection in context with the transcript.

12. A video conference system comprising:
  one or more media processing nodes configured to compile and provide a composite media stream associated with a video conference session; and
  one or more network devices configured to support provision of a user interface to a plurality of conferencing participant endpoints connected to the video conference session, wherein the user interface presents:
    participant-captured media stream highlights sequentially organized along a first manually-positionable recording timeline slider within a panel that is orthogonally arranged alongside a video display, of the composite media stream, having a second manually-positionable recording timeline slider, wherein the panel includes one or more transcripts of the participant-captured media stream highlights, at least one of the transcripts being annotated with visual indicators that mark a corresponding instance of the participant-captured media stream highlights, and
    indications of the participant-captured media stream highlights at the first manually-positionable recording timeline slider associated with recording time-based control of the video display at the plurality of conferencing participant endpoints.

13. The video conference system of claim 12, wherein the the panel further includes comments contemporaneously entered at one or more of the conferencing participant endpoints.

14. The video conference system of claim 13, further comprising toggle options for manual navigation between the participant-captured media stream highlights.

15. The video conference system of claim 13, further comprising a participant profile-defined default for automated sequential playback of the participant-captured media stream highlights.

16. A method comprising:
  compiling and rendering, by one or more media processing nodes, a composite media stream associated with a video conference session; and
  supporting, by one or more network devices, provision of a user interface to a plurality of conferencing participant endpoints connected to the video conference session, wherein the user interface presents:
    participant-captured media stream highlights sequentially organized along a first manually-positionable recording timeline slider within a panel that is orthogonally arranged alongside a video display, of the composite media stream, having a second manually-positionable recording timeline slider, wherein the panel includes one or more transcripts of the participant-captured media stream highlights, at least one of the transcripts being annotated with visual indicators that mark a corresponding instance of the participant-captured media stream highlights, and
    indications of the participant-captured media stream highlights at the first manually-positionable recording timeline slider associated with recording time-based control of the video display at the plurality of conferencing participant endpoints.

17. The method of claim 16, wherein compiling and rendering a composite media stream associated with a video conference session comprises integrating participant-captured media stream highlights from different client applications at at least two of the conferencing participant endpoints.

18. The method of claim 16, wherein compiling and rendering a composite media stream associated with a video conference session comprises integrating participant-captured media stream highlights from at least two of the conferencing participant endpoints using different standards-based communication protocols.

19. The method of claim 16, wherein supporting provision of a user interface to a plurality of conferencing participant endpoints comprises providing access to a web-based application by a client application executing at one or more of the conferencing participant endpoints.

20. A non-transitory computer-readable storage medium storing instructions, executable by a processor of a network device of a video conference system that includes one or more media processing nodes configured to compile and render a composite media stream associated with a video conference session, which when executed cause the network device to:
  support provision of a user interface to a plurality of conferencing participant endpoints connected to the video conference session, wherein the user interface presents:
    participant-captured media stream highlights sequentially organized along a first manually-positionable recording timeline slider within a panel that is orthogonally arranged alongside a video display, of the composite media stream, having a second manually-positionable recording timeline slider, wherein the panel includes one or more transcripts of the participant-captured media stream highlights, at least one of the transcripts being annotated with visual indicators that mark a corresponding instance of the participant-captured media stream highlights, and indications of the participant-captured media stream highlights at the first manually-positionable recording timeline slider associated with recording time-based control of the video display at the plurality of conferencing participant endpoints.

* * * * *